Sept. 4, 1928.

R. H. CHILTON

SPRING SHACKLE

Filed April 22, 1927

1,683,331

Inventor
Ralph H. Chilton

By Spencer Hardman & Fehr
his attorneys

Patented Sept. 4, 1928.

1,683,331

UNITED STATES PATENT OFFICE.

RALPH H. CHILTON, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed April 22, 1927. Serial No. 185,706.

This invention relates to flexible coupling members, especially such as are adapted for use as spring shackles on vehicles.

An object of this invention is to provide an improved form of flexible coupling having the advantages of economy of manufacture and assembling in place upon the parts connected thereby, efficiency and long life in operation, and of improved vibration absorbing qualities.

A more specific object is to provide a coupling member having a molded unit of elastic rubber composition which unit is easily distortable to permit easy longitudinal to and fro movement of the spring end but which highly resists distortion at right angles thereto which would permit lateral movement of the spring end.

This invention is somewhat similar to that described in my copending application Serial No. 179,360, filed March 29, 1927, but has certain obvious features thereover, as follows: (1) the present invention has only one molded in metal clamping insert and can therefore be more economically molded; (2) the flexible rubberized fabric casing may, if desired, be first plied up in relatively long lengths and short sections thereof for individual molded units cut off and bent to the desired shape and laid within the vulcanizing mold, whereas in the above application the fabric casing is plied up by wrapping in cylindrical form shown; (3) transversely extending fibers either loose, spun, or woven, are embedded and vulcanized within the elastic rubber material to minimize lateral bulging of the elastic rubber at the unconfined lateral sides and yet permit easy rolling distortion of the unit to provide for the to and fro movement of the spring end.

Another object is to provide a simple and efficient shackle seat member at the end of the long leaf of the spring which permits the spring leaf to be pierced but so reinforces the end thereof as to give a strong reliable construction.

Further objects and advantages of the present invention will be apparent from the following description, reference being had to the accompanying drawings wherein a preferred embodiment of one form of the present invention is clearly shown.

In the drawings.

Similar reference characters refer to similar parts throughout the drawings.

Numerals 10 and 11 designate the two relatively movable parts connected by the shackle, 10 being the chassis side rail or fitting rigidly secured thereto, and 11 the projecting end of the long leaf of spring 12.

Figure 1:
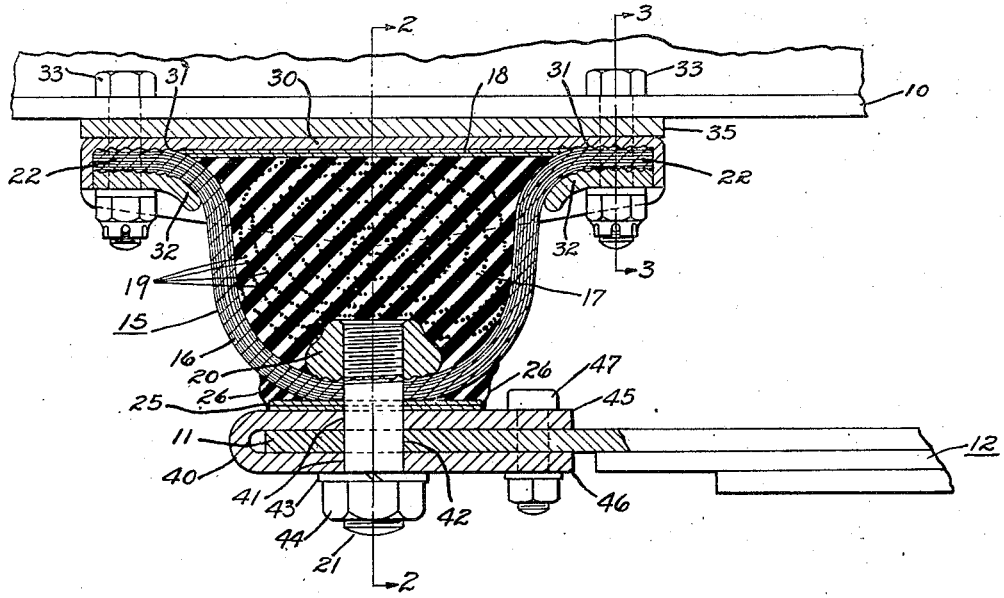
Fig. 1 illustrates a shackle built according to this invention mounted on the rear end of the front spring of an automobile chassis. The vertical section is taken on line 1—1 of Fig. 2.
Figure 3:
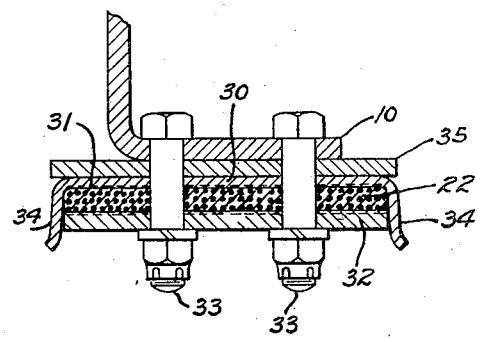
Fig. 3 is a section taken on line 3—3 of Fig. 1.
Figure 2:
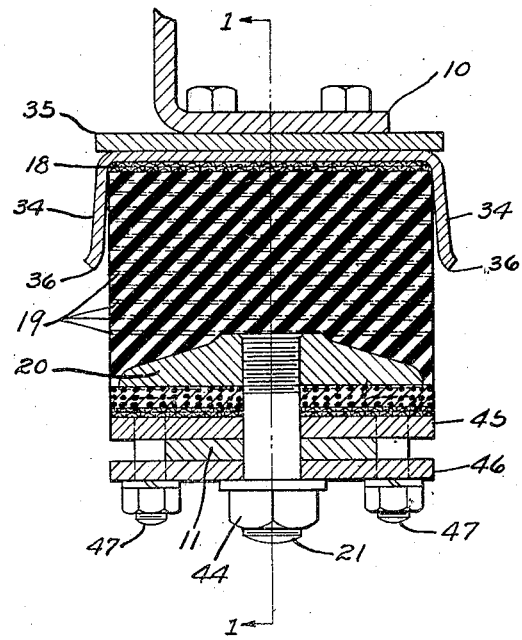
Fig. 2 is a section taken on line 2—2 of Fig. 1.

The molded unit, designated as a whole by 15, comprises a flexible rubberized fabric web 16, which preferably is composed of a plurality of plies or layers of rubberized cord fabric with the non-extensible cords thereof extending lengthwise of band 16 and molded in the form as shown. A molded in situ metal clamping insert 20 has a shank 21 integral therewith or fixed thereto projecting outwardly thru the fabric web 16. The interior space surrounding insert 20 is filled with a soft elastic rubber material 17 which will be firmly bonded by vulcanization to web 16. Preferably a relatively thin fabric layer 18 is molded upon the top of the elastic material 17 to provide a proper seating surface for the molded unit. In the manufacture of this unit, the unvulcanized flexible fabric web 16 may be first formed by coiling up suitable rubberized cord fabric upon a large drum to the desired thickness and number of plies, after which it is cut across and removed from the drum to give a relatively long straight length thereof. Short sections 16 of this web are cut off to the desired length, and the insert 20 put in place by inserting shank 21 through a suitable aperture in web 16 which may be made either by punching or by separating the cords thereof by means of a tapered pin or its equivalent. The web 16 is then put in a mold and bent to a shape substantially as shown in Fig. 1 with the shank 21 extending thru a hole provided in the mold for the purpose. The unvulcanized elastic rubber material 17 is next laid in the mold to fill the mold cavity with the fabric layer 18 on top thereof. Preferably this material 17 has embedded therein a suitable number of transversely extending reinforcing fibers, threads, or cords whose purpose is to prevent or materially limit lateral bulging or lateral elongation of the material 17 without limiting the distortion of this material in other directions. To this end the material 17 may be formed by being plied up with alternate layers of rubber and rubberized cords or cord fabric and the unvulcanzed plastic mass so formed laid and pressed down within the mold so that the substantially non-extensible cords thereof extend from side to side.

This may be most conveniently done by laying a strip of rubberized cords having the cords extending transversely of the strip upon a strip of caledered rubber of equal length, and then starting at one end and rolling these two strips together to form a solid roll of a diameter about equal to the depth of unit 15 and in which the rubber and cords are in alternate spiral layers. Lengths of this roll equal to the lateral dimension of unit 15 are then cut off and an individual section laid and pressed down within the mold upon web 16 and insert 20 with the embedded cords thereof extending from side to side as described above.

Another way in which the rubber material 17 may be prepared with transverse fibers or threads therein is to first thoroughly mix on a mixing mill the desired quantity of rubber and cotton or other fiber, which may conveniently be uncured friction scrap from tire manufacture. The product from the mixing mill is sheeted out by a differential action mill which serves to draw out the sheet since the rubber at one side of the sheet flows faster than the rubber at the opposite side thereof. The result therefore of passing the sheet repeatedly through a mill of this type will be to draw out the fibers and threads longitudinally of the sheet or lengthwise of the direction of feed and so give a generally parallel direction to the fibers, threads, or scrap pieces of cords therein. This sheet material may then be stacked up in layers or rolled up as described above to form the elastic rubber material 17 having fibers, threads, or cords embedded therein with a concerted generally parallel direction and extending from side to side of the molded unit 15.

Preferably a relatively stiff rubberized fabric seat 25 is molded in place and the wedge-shaped spaces 26 between the seat 25 and web 16 are filled with soft elastic rubber molded in place.

This molded unit 15 is vulcanized as a whole in the molding die, the desired degree of softness of the rubber in the various portions thereof being regulated by the amount of sulphur and accelerator in the rubber composition used in the various portions of the unit. By this means the soft rubber portions 26 may be made softer and more yielding than the material 17 in order to permit a free rolling movement of the web 16 upon the seat 25 during the to and fro movement of the spring end.

After unit 15 is removed from its vulcanizing mold the upper portion thereof is provided with a metal housing 30 which is illustrated in the drawings as a pressed metal part. The outwardly turned ends 22 of the flexible web 16 are very firmly clamped down upon the corrugated surface 31 of housing 30 by the metal clamping plates 32 which are drawn up by the bolts 33. These bolts 33 may extend through suitable apertures in member 10 (as shown) and thus also serve to rigidly secure the housing 30 together with the shackle unit to the member 10. If desired, a reinforcing or backing up plate 35 may be interposed between the relatively thin housing 30 and member 10 in order to properly support the laterally projecting edges of housing 30. Housing 30 is provided with laterally depending flanges 34 which laterally support the molded unit 15 to a point below the end curvatures of web 16 as clearly shown in Fig. 1. Hence lateral movement of the spring end is substantially prevented since the portion of unit 15 below the lower edges of flanges 34 is substantially rigid against lateral distortion, and yet is easily distorted to permit to and fro movement of the spring end, all of which is quite obvious from the drawings. Preferably the lower edges 36 of flanges 34 flare outwardly slightly from unit 15 in order to avoid harmful frictioning upon the unit 15 during longitudinal movement of the spring end.

To fix the shackle to the end of leaf 11, a U-shaped metal seat 40 is slipped over the projecting end of leaf 11 and the downwardly depending shank 21 of unit 15 is passed thru registering holes 41 and 42 in seat 40 and leaf 11 respectively and the lock washer 43 and nut 44 applied. When nut 44 is drawn up very tight the clamping insert 20 clamps the flexible web 16 and fabric seat 25 very firmly to the spring end. The free ends of the upper and lower plates 45 and 46 of seat 40 are firmly clamped to leaf 11 by the two bolts 47 which preferably pass adjacent the sides of leaf 11 and thru holes in the laterally projecting edges of plates 45 and 46. It is thus seen that leaf 11 is pierced only at 42 and that plates 45 and 46 being rigidly clamped upon leaf 11 for some distance away from hole 42 there can be little or no bending moment upon leaf 11 at the pierced section during either up or down loads exerted by the shackle.

Furthermore by providing seat 40 of greater width than leaf 11, the lateral width of the molded unit 15 may be made as great as good design dictates without any limitation being imposed by the width of leaf 11. The width of unit 15 may be such as to reduce lateral movement of the spring end within permissible limits and still provide easy longitudinal distortion of unit 15 to facilitate the to and fro movement of the spring end.

The flexible web 16 and the soft elastic material 17 are easily distorted longitudinally when spring 12 is flexed. The material 17 is held against lateral bulging by the reinforcing transverse fibers, threads, or cords 19 but it is easily distorted in a longitudinal direction to take the form of the distorted web 16 and so maintain web 16 under tension at all times, whether the shackle is under tension or compression. Each of the transverse cords 19 will be substantially isolated by elastic rubber.

While the form of embodiment of the present invention as herein disclosed, constitutes a preferred form, it is to be understood that other forms might be adopted, all coming within the scope of the claims which follow.

What is claimed is as follows:

1. An extension shackle connecting two relatively movable members, said shackle comprising: a flexible rubberized fabric web of approximate U-shape and having its two ends fixed to one of said movable members and its central portion fixed to the other of said movable members, and elastic rubber material within said web and vulcanized thereto for taking compression loads upon said shackle.

2. An extension shackle connecting two relatively movable members, said shackle comprising: a flexible rubberized fabric web of approximate U-shape and having its two ends fixed to one of said movable members and its central portion fixed to the other of said movable members, and elastic rubber material within said web and vulcanized thereto for taking compression loads upon said shackle, said elastic rubber having fibers embedded therein and extending substantially transversely to the direction of relative movement between said movable members, whereby lateral bulging of said elastic rubber material is minimized.

3. An extension shackle connecting two relatively movable members, said shackle comprising: a flexible rubberized fabric web having its central portion fixed to one of said movable members and its two end portions curved toward the other of said movable members and fixed thereto in spaced relation, and elastic rubber material filling the interior space in the loop of the web thus formed and vulcanized thereto.

4. An extension shackle connecting two relatively movable members, said shackle comprising: a flexible rubberized fabric web having its central portion fixed to one of said movable members and its two end portions curved toward the other of said movable members and fixed thereto in spaced relation, and elastic rubber material filling the interior space in the loop of the web thus formed and vulcanized thereto, said elastic rubber having textile material embedded therein to minimize the lateral bulging of said rubber at the sides unconfined by said flexible fabric web.

5. An extension shackle connecting two relatively movable members, said shackle comprising: a flexible rubberized fabric web having its central portion fixed to one of said movable members and its two end portions curved, first toward the other movable member and then outwardly from each other giving a reverse curve in each end portion and having the two ends thereof fixed to said other movable member, and elastic rubber material filling the loop thus formed in the fabric web and vulcanized thereto.

6. An extension shackle for connecting two relatively movable members comprising: a molded elastic rubber and fabric element having opposite portions thereof fixed respectively to said movable members, and textile material embedded in said elastic rubber and extending substantially transversely to the direction of relative movement between said movable members whereby lateral bulging of said elastic rubber is minimized.

In testimony whereof I hereto affix my signature.

RALPH H. CHILTON.